United States Patent
Gertung

[15] 3,666,951
[45] May 30, 1972

[54] DEVICE FOR DETECTING DEFECTS IN CONTINUOUS WEB MATERIAL

[72] Inventor: Kurt Gertung, Heikendorf near Kiel, Germany

[73] Assignee: Dr. Ing. Rudolf Hell

[22] Filed: Apr. 1, 1970

[21] Appl. No.: 24,479

[30] Foreign Application Priority Data

Apr. 16, 1969 Germany..........................G 69 15 129

[52] U.S. Cl. .........................250/219 DF, 356/200, 250/229
[51] Int. Cl. .......................................................G01n 21/32
[58] Field of Search.................250/219 F, 222 PC, 222, 229; 356/200, 237, 238, 159, 160

[56] References Cited

UNITED STATES PATENTS

| | | | |
|---|---|---|---|
| 2,944,147 | 7/1960 | Bolton | 250/219 X |
| 3,105,152 | 9/1963 | Nash | 250/219 X |
| 3,334,239 | 8/1967 | Nash | 356/200 X |
| 3,514,615 | 5/1970 | Noiles et al. | 356/159 X |
| 1,937,722 | 12/1933 | Simon et al. | 250/239 X |
| 2,592,847 | 4/1952 | Babicz | 250/238 X |
| 3,327,398 | 6/1967 | Leslie et al. | 250/219 X DF |

*Primary Examiner*—Walter Stolwein
*Attorney*—Hill, Sherman, Meroni, Gross & Simpson

[57] ABSTRACT

Elevational defects in a continuous web of material are detected by a sensing means including a vertically movable sensing roller positioned above a support roller and bearing down theretoward under the force of gravity so that it rests on the web supported by the support roller. Movement of the web in a first direction rotates the sensing roller in a first direction and causes the sensing roller to bear against a wiping means on a sensing roller retainer leg to remove any loose web material particles which may have adhered to the sensing roller so that false indications of elevational defects are prevented. The wiping means may include a blade arranged at an angle against the direction of rotation of the sensing roller and the blade may be a rigid member in a yieldable support or a resilient member in a resilient or rigid support.

10 Claims, 1 Drawing Figure

Patented May 30, 1972  3,666,951
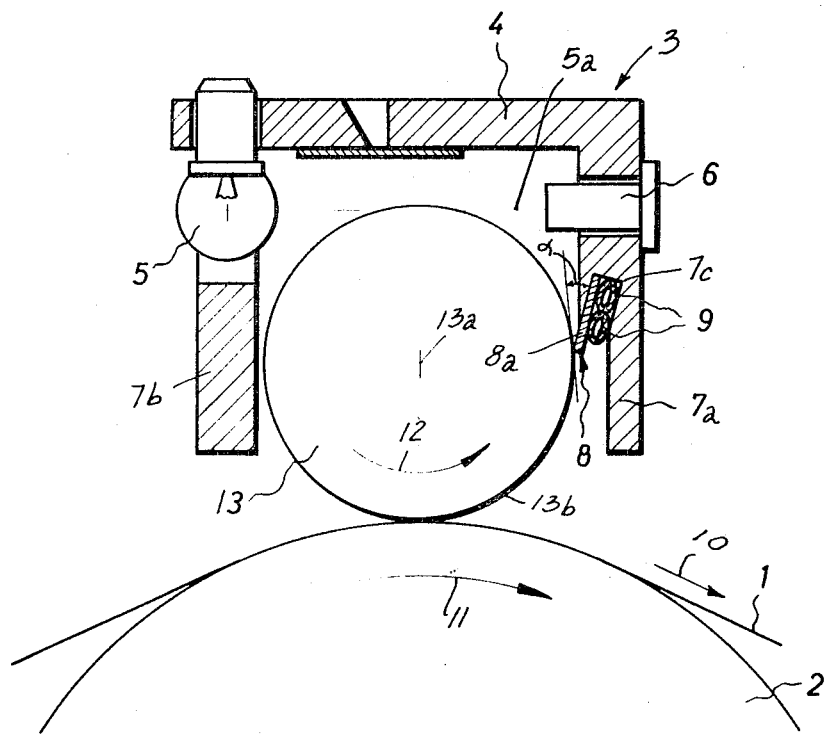
INVENTOR.
Kurt Gertung

DEVICE FOR DETECTING DEFECTS IN CONTINUOUS WEB MATERIAL

BACKGROUND OF THE INVENTION

1. Field of the Invention

This invention generally relates to apparatus for processing continuous web-like material and more particularly relates to a device for detecting irregularities in the surface of the web such as might be caused by calendar cuts, fourdrinier abrasions, knots or similar defects in continuous paper webs. The sensing means of the invention includes a roll retained in a position bearing on the web-like material at a point where it is supported by a support roller.

2. Prior Art

According to the prior art the means for detecting elevational irregularities in continuous webs of material have included very small sensing rollers having a length of about 40 millimeters and a correspondingly small diameter. A plurality of these small sensing rollers are arranged in a parallel, staggered relationship to form a row extending diagonally completely across the web width. Depending upon the web width the number of sensing rollers may reach 30 to 50. Each of these prior art sensing rollers cooperate with a photoelectric means whereby when an elevational irregularity occurs in the web the upward movement of the sensing roller in response to the irregularity triggers the photoelectric means so that the defect irregularity may be identified.

I have discovered that the passage of the continuous web of material in contact with the sensing roller causes a certain amount of dust or loose web material particles to adhere to the sensing rollers and that in the course of time the matter collected on the sensing roller may reach a thickness which corresponds to the height of a non-acceptable irregularity with the result that the sensing roller will register the dust layer as an irregularity. According to the prior art no provisions had been made to avoid such falsification of defects other than the normal maintenance of the continuous web processing apparatus during which the many small sensing rollers were required to be removed from their housing means, carefully cleaned and re-inserted. This procedure was difficult and time consuming and moreover did not prevent the reoccurrence of the situation by the adherence of a loose particle of web material to the sensing roller immediately after the roller had been cleaned. In such a case quantities of web material might be mistakingly rejected and scrapped until the defective detector could be identified and corrected. Such correction of course necessitated the interruption of the operation of the web processing apparatus thereby causing expensive downtime. When it is considered that each apparatus may have from 30 to 50 sensing rollers the possibility of falsification because of adherence of dust or particles may be seen to be correspondingly great.

SUMMARY OF THE INVENTION

The disadvantages present in the prior art are overcome by the present invention wherein a sensing roller wiping means is provided so that the movement of the web of material under the sensing roller causes the sensing roller to bear against the wiping means whereby any extraneous dust or particles which may adhere to the sensing roll are continuously wiped off its surface. Where the sensing roller is retained only by a retainer housing means the wiping means also serves as a replaceable bearing means which not only may have varying hardness but which also is more easily replaced. Thus, the wiping means may include a blade-like element which may be either a rigid member such as steel held in a yieldable support or a resilient blade-like member held in a resilient or rigid support.

According to a preferred embodiment of this invention the device for detecting elevational defects in a continuous web of material comprises a sensing means positioned above a web of material which is passing over a web supporting roller. The sensing means includes a vertically movable sensing roller which is cylindrical in shape and rests on the web under the force of gravity in the area of the web supported by the supporting roller so that the web passes in a first direction between the support and sensing rollers. The sensing means further includes an inverted U-shaped retainer housing means having the legs of the U parallel to the axes of the roller with a first leg on the side of the roller where the web is moving away from the roller and a second leg on the side of the roller where the web is moving toward the sensing roller. The sensing roller is free within the retainer housing and may move vertically but is prevented from moving laterally. A notch in the first leg of the U-shaped retainer housing supports a wiper means against which the sensing roller surface is caused to move upwardly toward and against by the movement of the web material in the first direction. This wiping means may advantageously take the form of a blade arranged at an angle of 10° to 20° to a tangent line at a point of contact with the sensing roller and in a direction generally opposite the direction of the rotation of the sensing roller. The wiping blade element itself may be of a yieldable substance such as rubber or plastic, for example, and may be rigidly or yieldingly supported. Similarly a wiping blade element of steel which is resiliently supported has also been found to be effective. In each case the wiping blade element generally provides the only contact with the sensing roller and thus serves as a resilient bearing means for the sensing roller which provides a smooth and steady support for the sensing roller that is not effected by any possible irregularities in the movement of the web material. A particularly advantageous angle of inclination of the blade to the sensing roller has been found to be 15°.

A light source and a photoelectric sensitive cell are arranged on opposite sides of a point on the sensing roller diametrically opposite its contact with the web material with the result that the sensing roller contacts an elevational irregularity or defect in the web material it will move upwardly into the path between the light source and the photoelectric cell to thereby signal the presence of the defect. Any fine dust on the surface of the web material which may adhere to and be picked up by the sensing roller will of course be wiped off by the blade-like wiping means so that the sensing roller will remain perfectly clean and false indications of elevational defects will be prevented.

BRIEF DESCRIPTION OF THE DRAWING

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which:

The FIGURE illustrates a cross-section through the combination of a supporting roller and sensing means showing the relative relation therebetween.

DESCRIPTION OF A PREFERRED EMBODIMENT

A device for detecting elevational defects in a continuous web of material 1 passing over a web supporting roller 2 includes a sensing means generally indicated at 3 which is positioned above the web 1 atop the web supporting roller 2 so that the web 1 passes between a sensing roller 13 and the supporting roller 2.

The sensing means further includes an inverted U-shaped retainer housing 4 having first and second legs 7a, 7b, respectively, positioned on opposite sides of said sensing roller 13 and extending generally parallel to the axis 13a of the sensing roller. Advantageously the sensing roller 13 is maintained in contact with the web 1 only under the force of gravity and may move freely in a vertical direction but is retained against movement laterally by the retainer housing 4. Movement of the web 1 in a direction indicated by the arrow 10 rotates the web supporting roller 2 in a clockwise direction indicated by the arrow 11 and rotates the sensing roller 13 in a counter-clockwise direction indicated by the arrow 12 so that the first leg 7a is on a side of the sensing roller 13 where the web 1 is moving away from the sensing roller and the second leg 7b is on a side of the sensing roller where the web 1 is moving toward the sensing roller. The first leg 7a supports a wiping means generally indicated at 8 in a notch 7c therein. As shown the wiping means 8 includes a blade-like member 8a supported in the notch 7c and inclined at an angle alpha ($\alpha$) to a line tangent to the sensing roller 13 at the point of contact of the blade-like member 8a with the sensing roller. The angle of course is on the side of the point of contact where the sensing roller 13 is moving away from the wiping blade element 8a. This angle alpha ($\alpha$) ranges from 10° to 20° and I have found the angle of 15° to provide especially good results with most materials.

The wiping blade element 8a may be a rigid member such as a steel blade yieldingly held in the notch 7c by resilient means such as shown at 9 or the blade-like member 8a may be of a resilient material such as rubber or plastic held by a resilient means 9 or a more rigid support, not shown. Regardless of the particular material used the blade-like member 8a, with the force of the movement of the web 1 in the direction 10 forcing the sensing roller 13 thereagainst, will effectively remove any dust which may adhere to an outer cylindrical surface 13b of the sensing roller 13 and thereby assure that the outer surface 13b will remain perfectly clean. It may be also seen how the resilient mounting of the blade-like element 8a will provide a resilient bearing means for the sensing roller 13. Any dust or particles adhering to the surface 13b which moves in a direction 12 toward the blade-like element 8a will be knocked loose from the surface and may be collected, blown away or otherwise suitably disposed of.

A light source 5 and a photoelectric cell 6 may be supported by the retainer housing 4 and arranged on opposite sides of a point on the sensing roller 13 diametrically opposite its point of contact with the web material 1 whereby any elevational irregularity defect in the web material will cause the sensing roller 13 to accommodate the same and move upwardly into the path 5a between the light source 5 and the photoelectric cell 6 to thereby signal the presence of elevational defects in the web.

From the above description of my invention it may be seen that I have provided an improvement in a device for detecting elevational irregularities or defects in a continuous web of material which overcomes the disadvantages of the prior art and is at the same time very simple, economical and easy to maintain.

Although minor modifications might be suggested by those versed in the art, it should be understood that I wish to embody within the scope of the patent warranted hereon all such modifications as reasonably and properly come within the scope of my contribution to the art.

I claim as my invention:

1. A device for detecting elevational defects in a continuous web of material comprising a supporting roller on which said web is adapted to be supported, a sensing means including a vertically movable free riding sensing roller, said sensing roller being positioned above said support roller and bearing down theretoward so that said web is between said support and sensing rollers, said sensing means further including a wiping means which contacts said sensing roller to remove any foreign matter therefrom and to position said free riding sensing roller.

2. A device for detecting elevational defects according to claim 1 wherein said wiping means includes a blade arranged at an angle to the surface of said sensing roller.

3. A device according to claim 2 wherein the blade is of a yieldable substance.

4. A device according to claim 2 wherein the wiping blade is yieldingly supported.

5. A device according to claim 2 wherein the wiping element is of a resilient material.

6. A device according to claim 2 wherein said angle to the surface of said sensing roller is in the range of 10° to 20°.

7. A device according to claim 2 wherein said angle of the blade to a tangent line at its point of contact with the sensing roll is approximately 15°.

8. A device according to claim 2 wherein the wiping element is a steel blade resiliently supported.

9. A device according to claim 1 wherein said sensing means includes an inverted U-shaped sensing roller retainer allowing free vertical movement of said sensing roller but preventing lateral movement thereof, a leg of said U-shape retainer having a notch therein, said wiping means including a wiping blade extending along the length of said roller and being arranged at an angle to the surface of said sensing roller, said wiping blade being resiliently mounted in said notch to bear against said roller.

10. A device according to claim 9 wherein said web moves in a first direction and said sensing and support rollers rotate in a first direction as said web passes therebetween, said sensing roller being rotated by the movement of the web in the first direction, said web causing said sensing roller to bear against said wiping blade on said retainer leg, said sensing means further including a light source and a photo-electric cell arranged on opposite sides of a point on said sensing roller diametrically opposite its contact with the web material whereby an elevational defect in said web material will cause said sensing roller to move upwardly into the path between said light source and photo-electric cell to thereby indicate the presence of elevational defects in said web, and wherein said wiping blade is positioned at an angle against the direction of rotation of said sensing roller to remove any loose web material particles which may have adhered to said sensing roller so that false indications of elevational defects are prevented.

* * * * *